United States Patent [19]

Doud

[11] Patent Number: 4,765,821

[45] Date of Patent: Aug. 23, 1988

[54] APPARATUS FOR LUBRICATING GLASSWARE MOLD

[75] Inventor: Wilbur O. Doud, Muncie, Ind.

[73] Assignee: Ball Corporation, Muncie, Ind.

[21] Appl. No.: 9,180

[22] Filed: Jan. 30, 1987

[51] Int. Cl.$^4$ .................... C03B 40/00; C03C 40/00; F16B 1/00

[52] U.S. Cl. ........................................ 65/169; 65/170

[58] Field of Search ................ 65/24, 25.1, 26, 158, 65/160, 169, 170, 262; 425/90, 107, DIG. 115

[56] References Cited

U.S. PATENT DOCUMENTS

| | | | |
|---|---|---|---|
| 3,141,752 | 7/1964 | Keller | 65/25 |
| 3,480,422 | 11/1969 | Lichok et al. | 65/170 |
| 3,508,893 | 4/1970 | Duggan | 65/170 |
| 3,623,856 | 11/1971 | Keller | 65/169 |
| 3,721,542 | 3/1973 | Keller | 65/169 |
| 3,814,594 | 6/1974 | Mumford | 65/169 |
| 3,981,711 | 9/1976 | Bjorkstrom | 65/165 |
| 4,409,010 | 10/1983 | Brown | 65/26 |
| 4,578,099 | 3/1986 | Hubner et al. | 65/26 |
| 4,579,574 | 4/1986 | Sugie et al. | 65/170 |
| 4,579,576 | 4/1986 | Jones | 65/265 |
| 4,604,120 | 8/1986 | Brown | 65/26 |

OTHER PUBLICATIONS

Renite Company Technical Publication "Renite Moto--Blank-Spray Constructon Details".

Primary Examiner—David L. Lacey
Assistant Examiner—Michael K. Boyer
Attorney, Agent, or Firm—Gilbert E. Alberding

[57] ABSTRACT

A glassware molding machine having a parison molding portion and a container body molding portion includes a spray apparatus with a spray head that is operatively attached to a spray spindle. Vaporized lubricant is sprayed radially outward from the spray head while the spray head is rotated and moved upwardly through the molding cavity. The automatic cycle of the glassware molding machine is interrupted while the mold halves are closed so that the lubricant is not deposited onto mating surfaces of the mold halves; a barrier of air is provided to prevent lubricant from being deposited onto the parison plunger; a collection system is provided to capture exhaust materials from the application of lubricant to the hot mold surfaces; and provision is made for depositing a heavier layer of lubricant, or a different lubricant, on a selected surface of the molding cavity.

11 Claims, 10 Drawing Sheets

APPARATUS FOR LUBRICATING GLASSWARE MOLD

TECHNICAL FIELD

The present invention relates generally to individual section glassware molding machines. More particularly, the present invention relates to apparatus and method for spraying various mold parts with lubricant.

BACKGROUND ART

In the formation of glassware, it has been common practice to form a parison, in a parison molding portion of the glassware molding machine, to automatically transfer the parison to a blow molding portion of the glassware molding machine, and then to blow mold the parison into conformity to a blow mold.

Commonly, the parison blank mold has been formed in two mold halves that each include a mating surface. The mold halves open and close around a parison axis; and when the mold halves are closed, the mating surfaces are juxtaposed together, a blank molding cavity is formed that is disposed circumferentially around the mold axis, and the blank molding cavity includes a parison molding surface.

A neck ring, that includes a pair of neck ring halves, is juxtaposed against the bottom of the parison blank mold and is clamped between grooves in the mold halves, a finish guide plate is retained in a groove in the neck ring halves, a parison baffle mold is provided to close a top opening of the inverted parison blank mold, and a parison plunger is movable upward into the molding cavity.

The blow mold portion of the glassware molding machine includes a body mold having a body molding cavity. The body mold includes both a body side mold and body bottom mold; and the body side mold includes body side mold halves that open and that close around a blow molding axis.

In operation, a gob of molten glass is deposited into the parison molding cavity, the parison baffle mold is placed over the top of the parison blank mold to close the top opening of the parison molding cavity, and the parison plunger moves upward within the parison molding cavity to form a parison within the parison blank molding cavity and the parison finish molding cavity.

The baffle mold is removed, the mold halves are opened, the parison is supported by the finish mold, and the finish mold, together with the parison, is transferred to the container body mold.

The body side mold halves close about the parison, the neck ring halves open to release the parison, the transfer device returns the finish mold to the blank mold, a blowhead is placed over the cavity opening in the top of the body mold, and the container body is formed to final size and shape. The blowhead is removed from the body mold, the body mold halves open, a takeout jaw moves to the body mold and closes around the finish, and the takeout jaw transports the container from the body bottom mold to a position for take away.

In the molding process described, it has been found necessary to lubricate the molding surfaces at frequent intervals during the production run, to prevent malfunctions of the process and to prevent both mechanical and thermal damage to parison and containers.

Commonly, lubrication of the molding surfaces has been a hand swabbing operation that is carried out periodically.

There have been at least eight types of problems, or limitations in the process, that have attended hand swabbing.

One problem has been that there is insufficient time to carefully swab the molding cavity during automatic cycling of the glassware molding machine. A second problem has been that hand swabbing has not deposited a uniform layer of lubricant onto the molding surface. Therefore, sufficiency of lubrication and the required frequency of hand swabbings have been two of the larger variables in the glassware molding process.

A third problem is that times between swabbings have been erratic due to other duties of the machine operator. A fourth problem is that there has been a tendency for machine operators to apply an unduly heavy coating of lubricant in an attempt to adequately swab the entire molding surface and/or in an attempt to swab less frequently.

A fifth problem has been generation of excess smoke in the work area due to the operating temperatures burning excessively heavy deposits of hand-swabbed lubricant off of the molding surfaces. A sixth problem has been contamination of parisons by excessive lubricant and a resultant reduction in the strength of the finished glassware.

A seventh problem has been that the mold halves have been open during hand swabbing. This has resulted in an accumulation of lubricant residue on the mating surfaces of the mold, incomplete closing of the mold halves, development of a fin of glass from the parisons that extend outward between the mold halves, and a resultant reduction in the strength of the finished glassware that is blown from parisons having this kind of surface irregularity.

An eighth problem with hand swabbing is that it is impossible to accurately lubricate selected portions of the molding surface more heavily than other portions. This precludes adequately lubricating surfaces that require greater lubrication without producing defects due to over lubrication and/or generation of excessive smoke from burning excessive lubricant.

There have been various attempts to lubricate the molding surfaces automatically.

Bjorkstrom, U.S. Pat. No. 3,981,711, teaches an automatic swabbing operation in which a swab is alternately dipped into a container of lubricant, and is alternately moved downwardly through both the parison blank mold and the neck ring. Bjorkstrom does the swabbing operation while the mold halves are closed; and he provides an air nozzle for distributing the lubricant and for blowing away excess lubricant. Of course, running a swab that is dripping with lubricant into the mold cannot provide a controlled application of lubricant, nor can it selectively coat selected areas with more lubricant than other areas.

Keller, U.S. Pat. Nos. 3,141,752, 3,623,856, and 3,721,542; Mumford, U.S. Pat. No. 3,814,594., Hubner et al., U.S. Pat. No. 4,578,099; and Brown, U.S. Pat. No. 4,604,120., all show mechanisms in which lubricant is sprayed into the parison molding surface from a position above and outside the parison blank mold. This position of the spray jet precludes uniform coating of either the parison blank molding surface or the parison finish molding surface.

The above-referenced patents which disclose spraying lubricant into the parison blank mold disclose various devices for moving the spray head out of the way during the molding process.

In addition to teaching lubrication by spraying a mist of lubricant downward into the parison blank mold, Hubner et al. teach the use of jet of air from the parison plunger head for preventing the mist of lubricant from settling onto the parison plunger and thereby causing defects in the parisons. While this method is feasible where only the parison blank mold is to be lubricated in the absence of the parison finish mold, it would not be feasible where both the blank and finish molds are lubricated while closed together as in the present invention.

Brown, U.S. Pat. No. 4,409,010, teaches spraying the lubricating mist onto the blank mold halves while they are open. The obvious problem with this is that the mating surfaces of the mold halves are coated with the lubricant, resulting in a build-up on the mating surfaces, defects in the parisons, weakened glassware, and downtime for cleaning off the deposits.

Sugie et al., U.S. Pat. No. 4,579,574, shows apparatus in which lubricant is sprayed upward, and at an angle to the mold axis, into the neck rings and into the blank molding cavity. Of course, it is impossible to accurately and uniformly coat the parison molding surfaces with jets that are located outside of the parison molds and at an angle to the mold axis. In like manner, it is impossible to coat selected areas with a greater quantity of lubricant than other areas.

DISCLOSURE OF THE INVENTION

In the present invention, a lubricant projecting head such as a spray head, as is described in this embodiment, is attached, or is integral with, a spindle that is vertically disposed. The spindle is accurately rotated into position over the open upper end of the mold by a horizontally disposed arm, and the spindle is moved downwardly, along the mold axis, into and through the molding cavity.

The spray or projection head sprays lubricant which may be a solid or liquid material vaporized by a gaseous fluid such as air, as is described in this embodiment, radially outward from the spray head at a selected circumferential position thereof, and generally orthogonally to the mold axis, while the spindle and the spray head are rotated and moved vertically.

Optionally, the spray head sprays a three hundred sixty degree pattern that is generally orthogonal to the mold axis, and the spindle and spray head are not rotated.

Because the preferred spray head, and also the optional spray head, spray generally orthogonally to the mold axis, and because the spray head is moved through the molding cavity, the present invention provides substantially uniform coating of lubricant on all molding surfaces without regard to changes in contour or diameter.

Optionally, the present invention includes a shuttle valve that provides separate supply passages from two different lubricants, and that serves as an automatic means for selecting one of the lubricants to lubricate one portion of the molding surface and the other of the lubricants to lubricate another portion of the molding surface, in accordance with differences in fluid pressures applied to respective ones of the separate supply passages.

The arcuate position of the spindle and spray head is controlled by a rotary actuator, the vertical position of the spindle and spray head is controlled by a linear actuator that is coaxial with the rotary actuator, and a linear differential transformer, that is also coaxial with the rotary actuator, provides means for sensing the vertical position of the spray head.

The purpose of the linear differential transformer is not only to sense the vertical position of the spray head, but also to cooperate with a programmable controller to selectively change the vertical velocity of the spray head at selected vertical positions, or to change the rate of flow of lubricant, and thereby to provide predeterminately thicker or thinner coats of lubricant on selected molding surfaces.

The present invention also includes barrier means for preventing accidental depositing of lubricant on the parison plunger. This barrier means includes a vertically disposed passageway in the spindle, jets of fluid such as air, as is described in this embodiment, that are disposed near the bottom of the spindle and that are aimed generally downward, and supplying pressurized air to the vertically disposed passageway.

Air from these air jets progresses downwardly, impinges upon the parison plunger, turns radially outwardly and upwardly, and progresses upwardly, around the spindle and spray head, and through the parison blank mold to the top opening thereof, carrying with it excess lubricant which is still in vaporized form.

An exhaust means is disposed circumferentially around the spindle, is attached to the horizontally disposed arm, and is positioned coaxially with the mold axis during the lubricating operation, so that excess vaporized lubricant is collected by the exhaust means.

In addition to providing means for collecting excess vaporized lubricant, the exhaust means also cooperates with the air jets in turning the air upward from the parison plunger, and drawing both this air and excess vaporized lubricant upward, away from the parison plunger, and into the exhaust means.

Means is provided for stopping the regular molding cycle periodically, so that adequate time is available to lubricate the closed mold halves; and means is provided for diverting gobs of molten glass from the parison blank mold during the lubricating operation.

The lubricant or parting agent of the subject invention may be a single chemical or a mixture of chemical constituents. The agent may be an organic or inorganic oil as well as graphite or other material dispersed in a water base or organic base carrier.

It is a primary object of the present invention to provide apparatus and method for selectively applying a lubricant or parting agent to the molding surfaces of the parison blank mold, the parison finish mold, the container body side mold, and the container body bottom mold.

It is an object of the present invention to lubricate the parison blank molds, the finish molds, the container body side molds and the container body bottom molds while the mold halves thereof are closed so as to avoid depositing lubricant on the mating surfaces of the mold halves.

It is an object of the present invention to interrupt the automatic cycle while the mold halves are closed to provide sufficient time for lubricating all molding surfaces.

It is an object of the present invention to divert gobs of molten glass away from the parison blank mold during the lubrication cycle.

It is an object of the present invention to move the spray head transversely away from the mold during automatic cycling of the glassware molding machine and thereby avoid lubricant dripping from the spray head into the mold cavity.

It is an object of the present invention to spray the lubricant generally orthogonally to the mold axis so that uneven contours of the molding surfaces can be coated substantially uniformly.

It is an object of the present invention to make predetermined changes in the vertical velocity of the spray head at predeterminately determined positions, and/or changes in the flow rate of the lubricant, so that selected areas of the molding surfaces can be coated more heavily with lubricant than other molding surfaces.

It is an object of the present invention to use two different lubricants during a single lubricating cycle, one for the parison blank molding surface, and the other for the parison finish molding surface.

It is an object of the present invention to provide an air barrier that prevents vaporized lubricant from being deposited onto the parison plunger.

It is an object of the present invention to provide an exhaust system that collects excess vaporized lubricant.

It is an object of the present invention to combine an air barrier system with an exhaust system to provide a flow path for barrier air that carries excess vaporized lubricant upward into the exhaust system.

Other objects of the present invention are to reduce downtime for mold cleaning, to reduce contaminant inclusions in parisons, to reduce surface irregularities in parisons, to reduce the percentage of rejections in the molded glassware, and to improve the strength of the molded glassware.

BEST MODE FOR CARRYING OUT THE INVENTION

The following description will apply to a lubricating apparatus located on the parison forming side of the glass machine.

Figure 1:
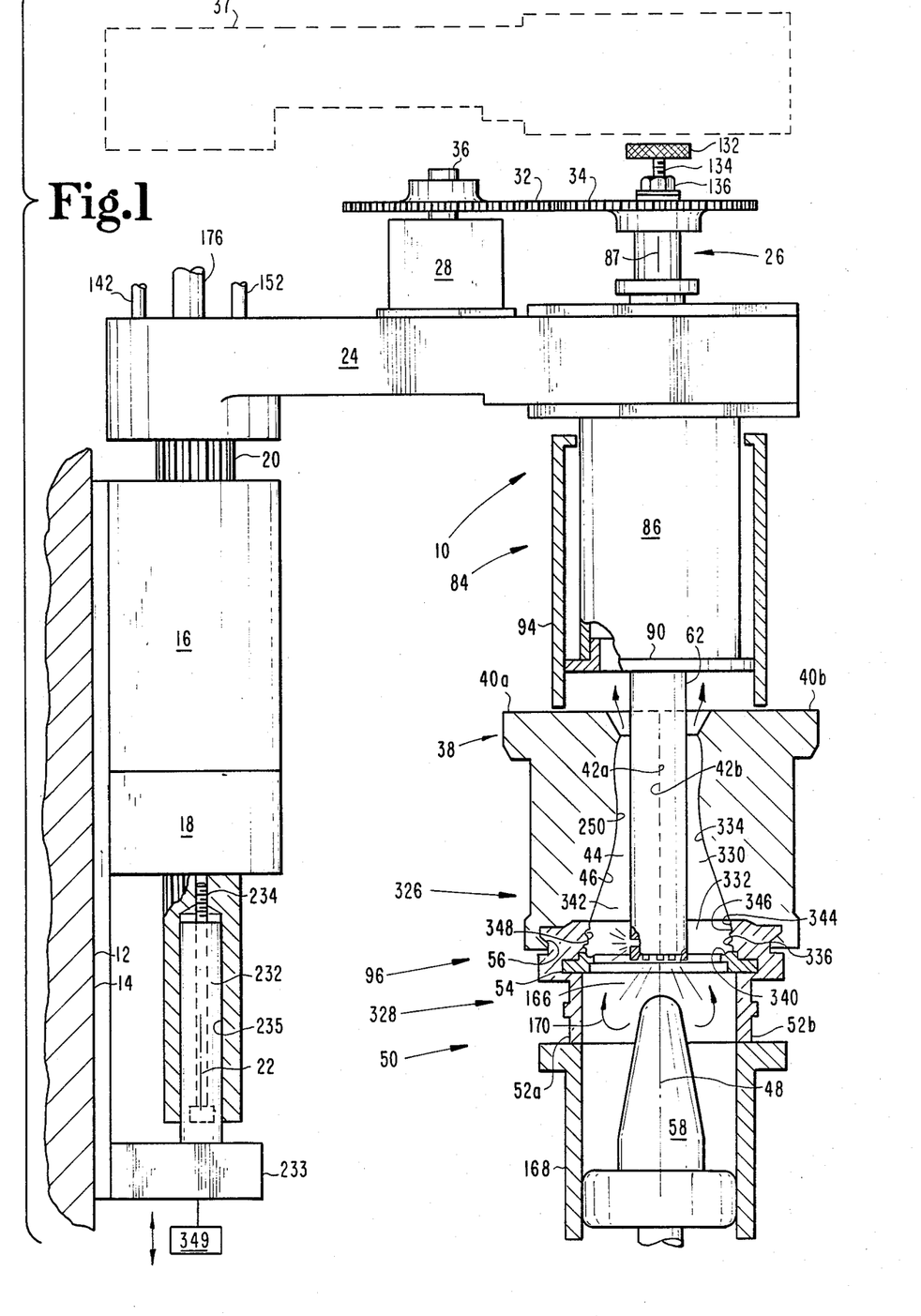
FIG. 1 is an elevation view of the spray apparatus of the present invention with the parison blank mold and the parison finish mold of the glassware molding machine shown in cross section, and a phantom view of the support arm showing the raised position thereof.

Referring now to the drawings, and more particularly to FIG. 1, a spray apparatus, or lubricant directing or projecting means, 10 is attached to a parison molding portion 12 of a glassware molding machine 14 with means for vertical position adjustment 349. The spray apparatus 10 includes a reciprocating actuator 16 that is attached to the parison molding portion 12, a rotary actuator 18 that is attached to the reciprocating actuator 16, and a splined shaft 20 that extends through the reciprocating actuator 16 and the rotary actuator 18. The splined shaft 20 is reciprocated by the reciprocating actuator 16 along a pivot axis 22 and is rotated around the pivot axis 22 by the rotary actuator 18.

Figure 2:
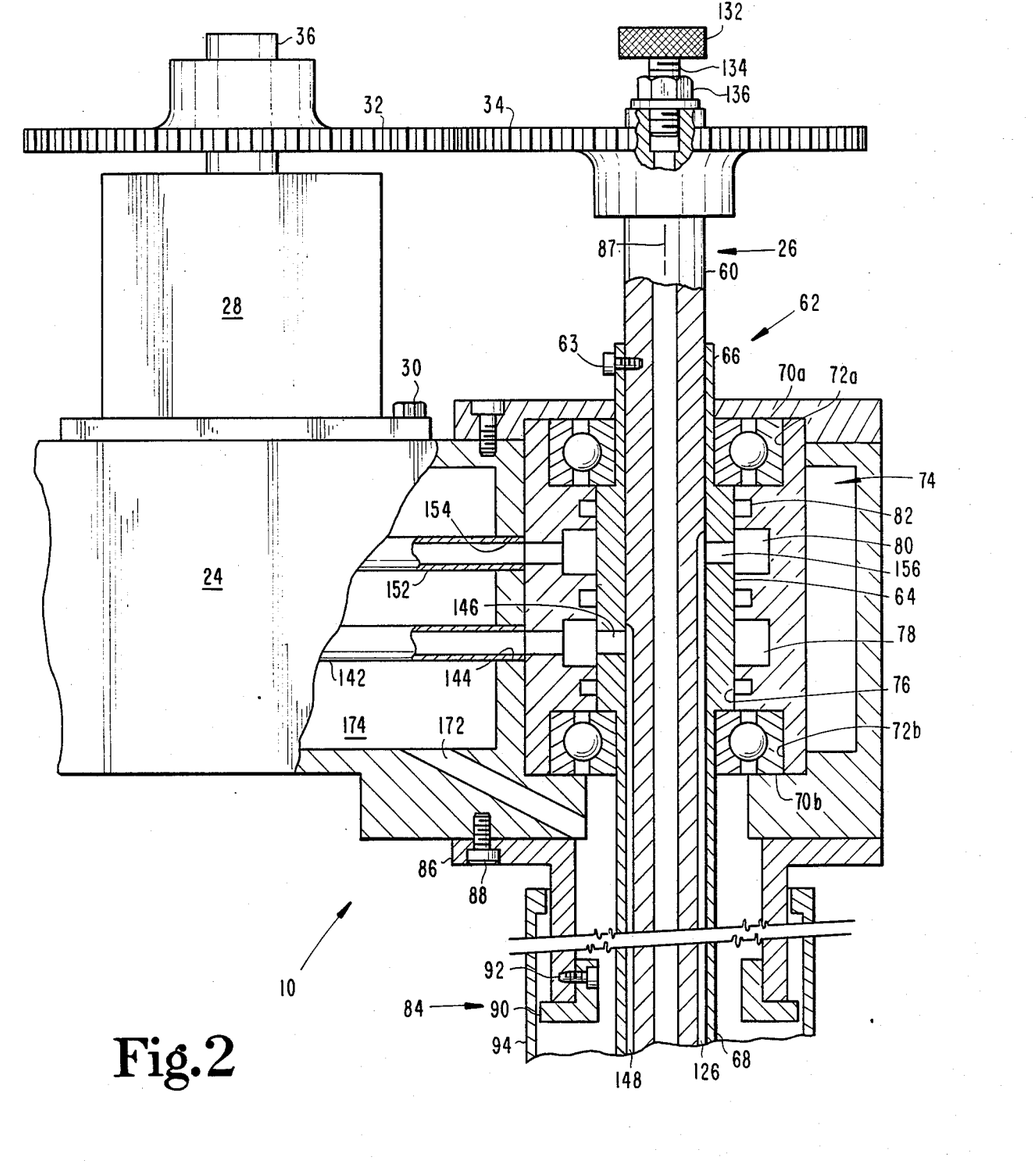
FIG. 2 is a partial elevation view of the spray apparatus of the present invention, taken substantially the same as FIG. 1, and showing, in cross section, details of mounting the spray spindle to the support arm.

A support arm 24 is operatively attached to the splined shaft 20 and is rotated about the pivot axis 22 by the rotary actuator 18. A spray spindle, or directing spindle, 26 is rotatably attached to the support arm 24 by means which will be described subsequently. The spray spindle 26 is rotated by a rotary actuator 28 that is attached to the support arm 24 by bolts 30, as shown in FIG. 2, and by gears 32 and 34. Gear 32 is attached to a shaft 36 of the rotary actuator 28 and gear 34 is attached to the spray spindle 26. The support arm 24 is movable between the position shown and a phantom position 37 by the reciprocating actuator 16.

As is typical in the prior art, the parison molding portion 12 of the glassware molding machine 14 includes a parison blank mold 38 having mold halves 40a and 40b which include mating surfaces 42a and 42b. The parison blank mold 38 further includes a blank molding cavity 44 having a blank molding surface 46. The mold halves 40a and 40b are closable by movement transversely toward a mold axis 48 wherein the mating surfaces 42a and 42b are juxtaposed together.

The parison molding portion 12 further includes a neck ring 50 having neck ring halves 52a and 52b which retain a finish guide plate 54. The blank mold halves 40a and 40b include a circumferential groove 56 which receivably retains and clamps the neck ring 50 against the parison blank mold 38. The parison molding portion 12 further includes a parison plunger 58 that is reciprocally actuated along the mold axis 48 in the manner taught in the prior art.

Referring now to FIG. 2, the spray spindle 26 includes a spindle shaft 60, and a spindle sleeve 62 which is coaxially disposed around the spindle shaft 60 and which is secured to the spindle shaft 60 by a positioning bolt 63. The spindle sleeve 62 includes a spacer portion 64, an upper sleeve portion 66, and a lower sleeve portion 68. A bearing 70a is pressed onto the upper sleeve portion 66 and a bearing 70b is pressed onto the lower sleeve portion 68.

The bearings 70a and 70b are mounted respectively into counterbores 72a and 72b of a bearing housing 74. The bearing housing 74 includes a spacer portion 76 which separates the counterbores 72a and 72b. The spacer portion 64 of the spindle sleeve 62 and the spacer portion 76 of the bearing housing 74 cooperate with manifold grooves 78 and 80 and with rotary seals 82 for separately supplying vaporized lubricant and pressurized air, respectively.

Referring now to FIGS. 1 and 2, the directing or projecting means 10 includes an exhaust system 84. The exhaust system 84 includes a flanged exhaust tube 86 which is disposed circumferentially around a spindle axis 87 and which is attached to the support arm 24 by bolts 88, a stop collar 90 which is attached to the flanged exhaust tube 86 by bolts 92, and a telescoping sleeve 94 which is circumferentially disposed around the exhaust tube 86 and which telescopically slides upward around the exhaust tube 86 as the telescoping sleeve 94 engages the parison blank mold 38.

The spindle axis 87 is disposed substantially in the mold axis 48 when the directing or projecting means 10 is in the position as shown in FIG. 1.

Figure 3:
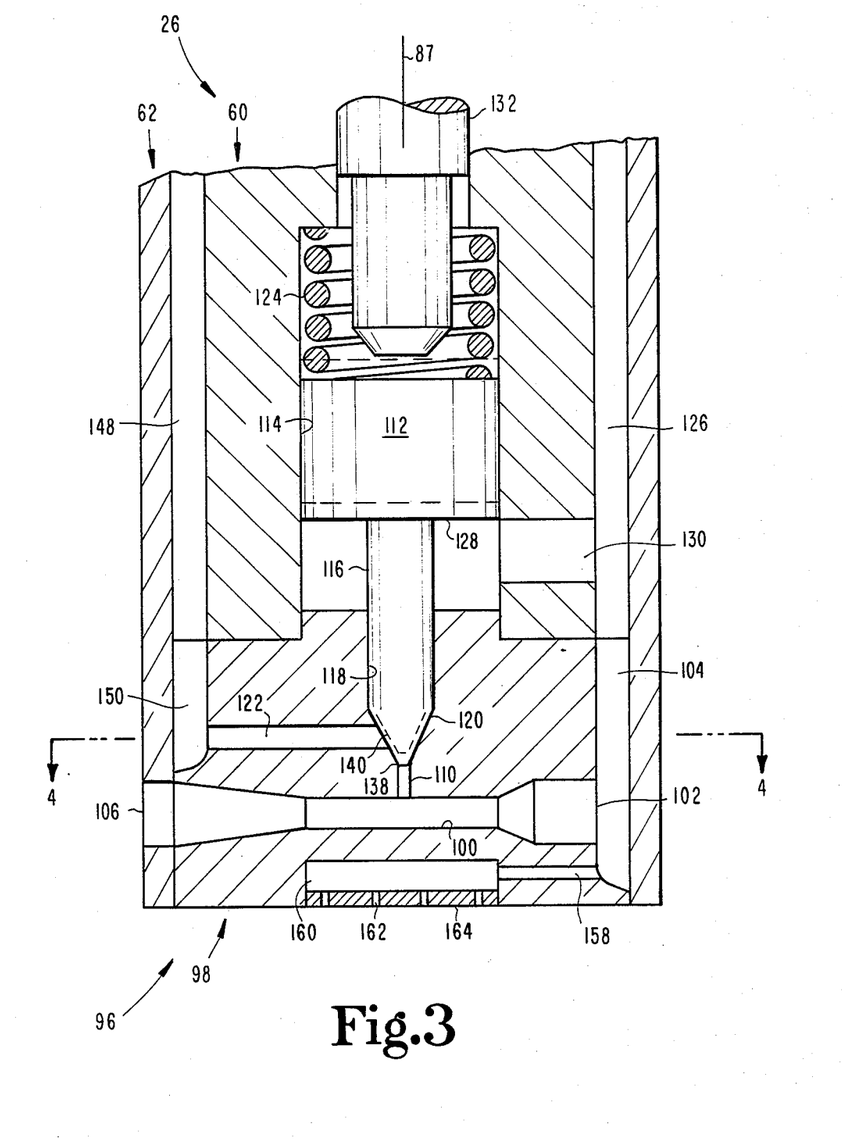
FIG. 3 is a cross sectional view, taken substantially the same as FIG. 1, and showing an embodiment of the spray head which sprays lubricant outward from a single circumferential location.

Referring now to FIGS. 1, 2, and 3, and more particularly to FIG. 3, the directing or projecting means 10 includes a directing head, or spray head, 96. The spray head 96 includes portions of the spindle shaft 60, portions of the spindle sleeve 62, and a spray body, or directing body, 98 that is juxtaposed against the spindle shaft 60 and that is disposed inside the spindle sleeve 62.

The spray head 96 includes a nozzle 100 that is disposed in the spray body 98. The nozzle 100 has an inlet 102 which communicates with a longitudinally disposed air passage 104 in the spray body 98 and an outlet 106 which opens radially outward from the spray spindle 26 and which is disposed substantially orthogonally with regard to the spindle axis 87. A feed orifice 110 is disposed circumferentially around the spindle axis 87 and opens into the nozzle 100 intermediate of the inlet 102 and the outlet 106 thereof.

The spray head 96 includes a metering piston 112 that is coaxially disposed around the spindle axis 87 and that is longitudinally slidable in a piston bore 114 of the spindle shaft 60. A metering poppet 116 is attached to the metering piston 112, is slidably fitted into a bore 118 of the spray body 98, and includes a conical portion 120 which engages the feed orifice 110. A feed passage 122 selectively and variably communicates with the feed orifice 110 in accordance with vertical positioning of the conical portion 120 of the metering poppet 116.

The metering piston 112 is forced downwardly by a spring 124 and is forced upwardly by air from a longitudinally disposed air passage 126 in the spindle shaft 60 engaging a bottom surface 128 of the metering piston 112 by way of a transverse passage 130.

In operation, the metering piston 112 is moved upwardly against an adjusting screw 132 by air pressure against the bottom surface 128 of the metering piston 112, compressing the spring 124; so that the vertical position of the piston 112 is determined solely by manual positioning of the adjusting screw 132, threads 134, and lock nut 136, thereby selectively providing a metered flow path 138 between the passage 122 and the feed orifice 110 when the metering poppet 116 is adjusted upwardly as shown by phantom position 140.

Lubricant is supplied to the metered flow path 138 by a lubricant conduit 142 which extends upwardly out of the support arm 24 and which is inserted into a hole 144 in the support arm 24, the manifold groove 78, a radially disposed hole 146 in the spindle sleeve 62, a longitudinally disposed lubricant passage 148 in the spindle shaft 60, a longitudinally disposed lubricant passage 150 in the spray body 98 which communicates with the lubricant passage 148, and the feed passage 122.

Air is supplied to the nozzle 100 by an air conduit 152 which extends upwardly out of the support arm 24 and which is inserted into a hole 154 in the support arm 24, a radially disposed hole 156 in the spindle sleeve 62 which communicates with the air passage 126, and the air passage 104.

Thus pressurized air is supplied to the inlet 102 of the nozzle 100, draws lubricant into the nozzle 100 from the feed orifice 110 in accordance with selective adjustment of the flow path 138 by the adjusting screw 132, and sprays vaporized lubricant radially outward from the outlet 106 of the nozzle 100.

Referring now to FIGS. 1, 2 and 3, the directing or projecting means 10 includes means for providing a barrier of air between the vaporized lubricant that is being sprayed and the parison plunger 58. This air is supplied from the air passages 126 and 104 of FIG. 3, a passage 158 in the spray body 98, a chamber 160, and orifices 162 in an orifice plate 164; so that jets of air are projected downwardly against the parison plunger 58 as shown by lines 166 of FIG. 1. Since downward flow of air is prevented by a plunger guide sleeve 168 that is juxtaposed against the neck ring 50, the air being discharged through the orifices 162 must turn and flow upwardly as shown by arrows 170.

The air being discharged through the orifices 162 moves upwardly and radially between the spray spindle 26 and the parison molding cavity 330, carrying excess lubricant spray into the telescoping sleeve 94 of the exhaust system 84, radially in between the exhaust tube 86 and the spray spindle 26, through a passageway 172 in the support arm 24, into a cavity 174 of the support arm 24, and to a vacuum source, not shown, by way of an exhaust conduit 176.

Figure 3A:
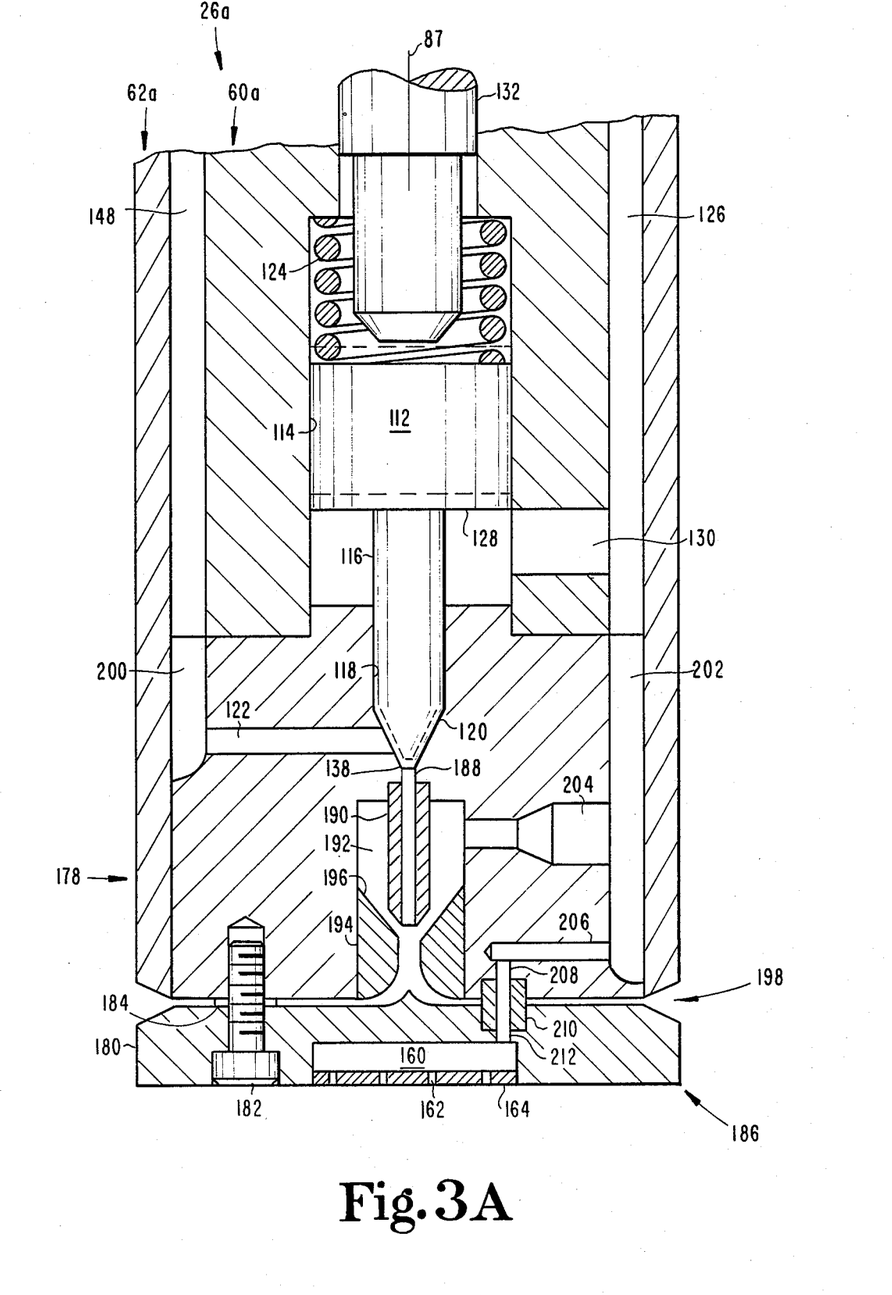
FIG. 3A is a cross sectional view, taken substantially the same as FIG. 3, and showing an alternate embodiment of the spray head which sprays lubricant outward from the entire circumference of the spray head.

Referring now to FIG. 3A, in a second configuration, a spray spindle, or directing spindle, 26a includes a spindle shaft 60a and a spindle sleeve 62a which are generally the same as the same named parts of FIGS. 2 and 3, a spray body, or directing body, 178, and a spray plate, or directing plate, 180 which is attached to the spray body 178 by bolts 182 and spacers 184.

The spray spindle 26a includes a spray head, or directing head, 186. The spray head 186 includes the piston 112, the metering poppet 116, the conical portion 120, the feed passage 122, the flow path 138 that is controlled by the conical portion 120, a feed orifice 188, a feed sleeve 190 which extends downwardly from the feed orifice 188 into a mixing chamber 192, a mixing sleeve 194 having a mixing orifice 196, and a circumferential spray opening 198 which consists of the space which is provided between the spray body 178 and the spray plate 180 by the spacers 184.

Referring now to FIGS. 1, 2, and 3A, in operation, lubricant is supplied to the lubricant conduit 142, flows through the hole 144, and through the manifold groove 78, the hole 146, the lubricant passage 148, a longitudinally disposed lubricant passage 200 that communicates with the lubricant passage 148, the passage 122, the flow path 138, the feed orifice 188, the feed sleeve 190, and into the mixing chamber 192.

In the mixing chamber 192, the lubricant is mixed with pressurized air that is supplied from the air conduit 152 to the mixing chamber 192 via the hole 154, the manifold groove 80, the hole 156, the air passage 126, a longitudinally disposed air passage 202, and a stepped hole 204.

Pressurized air exits the mixing chamber 192 through the mixing orifice 196, carrying vaporized lubricant through the mixing orifice 196, and radially outward through the circumferential spray opening 198.

At the same time, pressurized air from the air passage 202 flows radially inward through a hole 206, downward through a hole 208, through a connector tube 210, through a hole 212, into the chamber 160, and through orifices 162 in the orifice plate 164, providing a blanket of air between the sprayed lubricant and the parison plunger 58, as previously described for the embodiment of FIG. 3.

Figure 4:
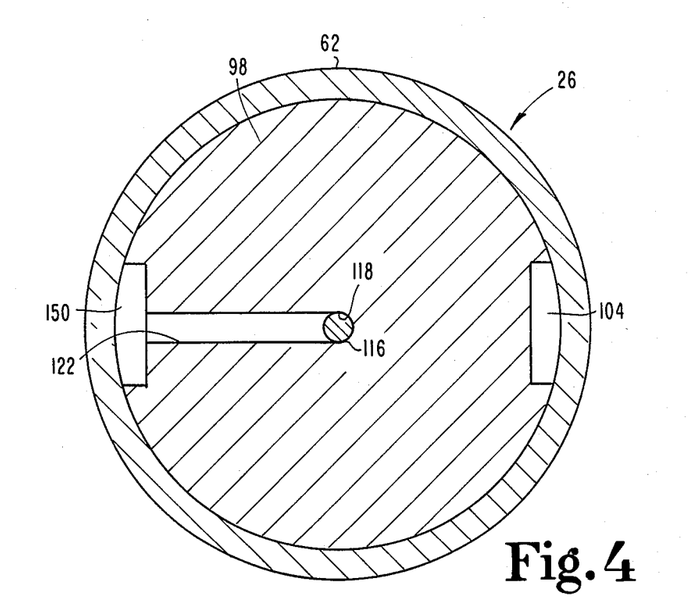
FIG. 4 is a cross sectional view of the spray head of FIG. 3, taken substantially as shown by section line 4—4 of FIG. 3.

Referring now to FIG. 4, in this cross sectional view of the spray spindle 26, the spindle sleeve 62, the spray body 98, the metering poppet 116, the bore 118, the passages 104 and 150, and the feed passage 122 are all shown in cross section, so that FIG. 4 further clarifies the description of the spray spindle 26 which was given in cooperation with FIGS. 1, 2, and 3.

Figure 4A:
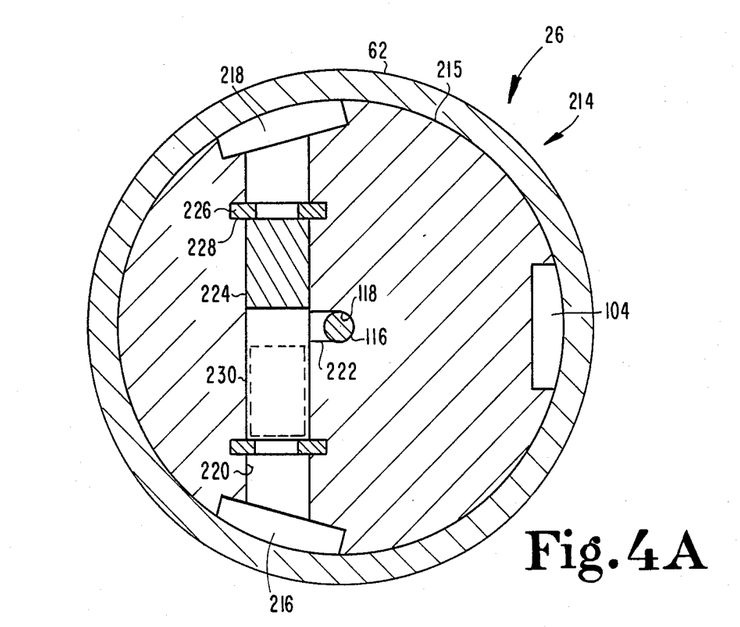
FIG. 4A is a cross sectional view of a spray head that is similar to the spray head of FIG. 3, and taken substantially the same as FIG. 4, but modified to selectively spray two different lubricants.

Referring now to FIG. 4A, in an optional embodiment for feeding vaporized lubricant through the nozzle 100 of FIG. 3, or through the circumferential spray opening 198 of FIG. 3A, apparatus is provided for selectively supplying one of two lubricants to the metering poppet 116.

A spray head, or directing head, 214 is identical to the spray head 96 of FIG. 3, or to the spray head 186 of FIG. 3A except for the following described parts. The spray head 214 includes the following parts which are disposed in a spray body, or directing body 215: a first lubricant passage 216, a second lubricant passage 218, a shuttle bore 220 that interconnects the lubricant passages 216 and 218, a feed passage 222 that communicates the bore 118 with the shuttle bore 220, a shuttle 224, and stop rings 226 that are disposed into respective ones of grooves 228.

In operation, first and second lubricants are supplied to the lubricant passages 216 and 218 in a manner similar to the supplying of a single lubricant, as described in conjunction with FIGS. 1-3. As the spray head 214 moves upwardly through the parison molding cavity 330 of FIG. 1, the first lubricant in the lubricant passage 216 is pressurized at a higher pressure than the second lubricant in the lubricant passage 218, forcing the shuttle to the position shown, and providing a flow path for the lubricant from the lubricant passage 216 to the feed passage 222. In like manner, when the pressure of the lubricant in the lubricant passage 218 is the largest, the shuttle 224 moves to the position shown by phantom shuttle 230.

Figure 6:
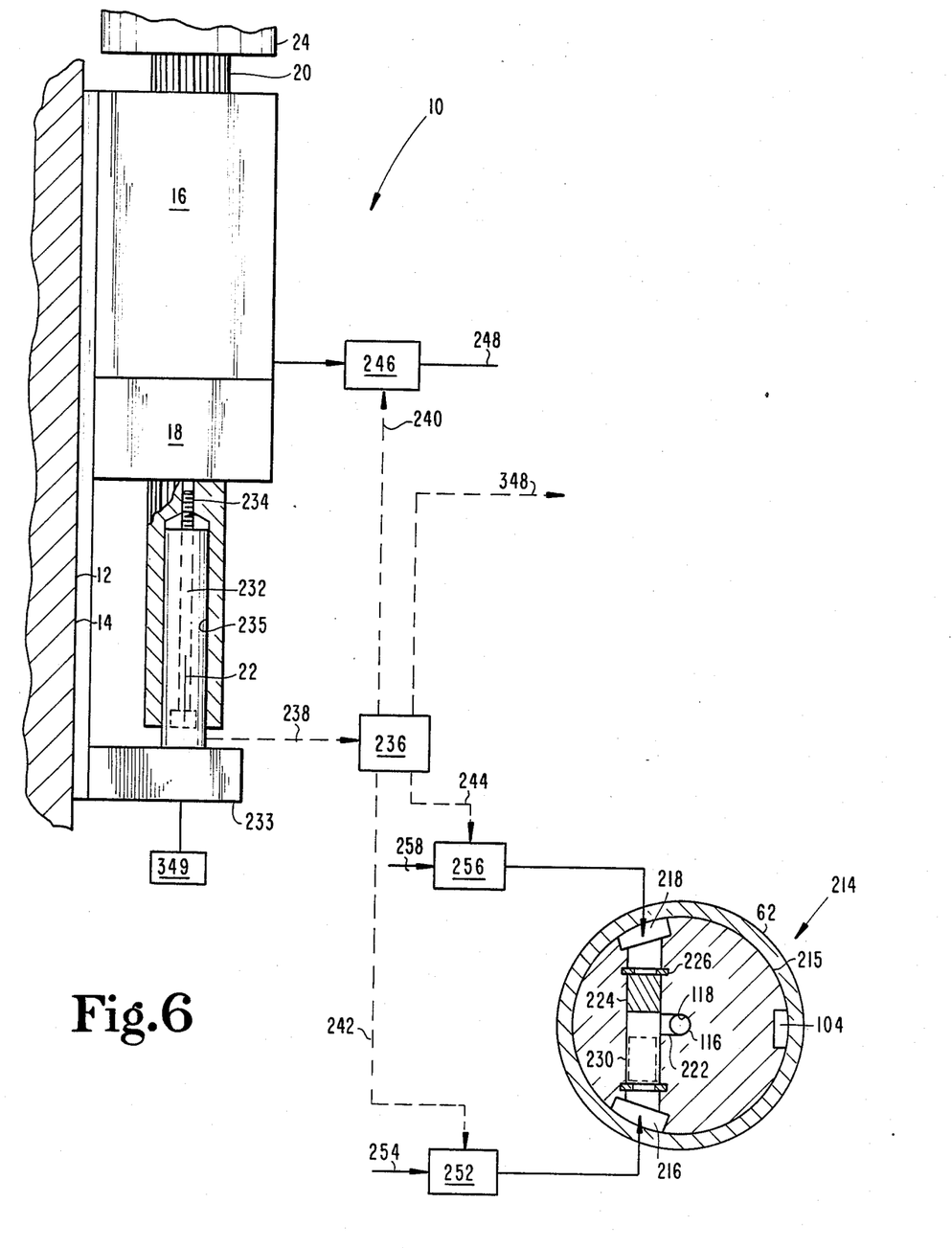
FIG. 6 is a schematic view of a portion of the mechanism of FIG. 1, the cross sectional view of FIG. 4A, and control circuitry.

Referring now to FIGS. 1, 4A, and 6, a linear differential transformer 232 is disposed longitudinally along the pivot axis 22, is attached to the parison molding portion 12 of the glassware molding machine 14 by a bracket 233 and to the splined shaft 20 by a threaded rod 234, slides inside a bore 235 of the splined shaft 20, and provides a signal that is proportional to the instantaneous vertical position of the reciprocating actuator 16, the support arm 24, and the spray head 96.

The linear differential transformer 232 is connected to a programmable controller 236 by a conductor 238; and the controller 236 provides control signals in conductors 240, 242, and 244, as a function of the instantaneous vertical positions of the spray head 96, in accordance with selective programming of the controller 236.

In operation, a control signal in the conductor 240 controls a flow control valve 246 that is disposed in a conduit 248 and that selectively controls the flow of fluid exiting from the reciprocating actuator 16 so that the vertical movement of the spray head 96 can be controlled as needed to provide a timed pause or variable velocity while spraying lubricant on the finish mold cavity surface 336, and to provide a variable velocity while spraying lubricant on the blank mold cavity surface 46.

In addition, as the spray head 96 reaches the lower position in the parison molding cavity 330, the controller 236 provides a control signal in the conductor 242 that controls a pressure valve 252 which increases the pressure of a first lubricant that is being applied to the lubricant passage 216 via a conduit 254, forcing the shuttle 224 to the position as shown, and delivering the first lubricant to the metering poppet 116; and thereon to the finish mold cavity 332.

And, as the spray head 96 progresses upwardly toward the blank cavity 44, the controller 236 cooperates with the linear differential transformer 232 to provide a signal in the conductor 244 that acts upon a pressure valve 256, increasing the pressure of a second lubricant in a conduit 258, moving the shuttle 224 to the position shown by the phantom shuttle 230, and delivering the second lubricant to the metering poppet 116 for spraying the blank cavity 44 with a different lubricant that is suited to the different needs.

Optionally, a heavier or lighter spray can be applied to selected portions of either the finish mold cavity surface 336 or to the blank mold cavity surface 46 by varying the respective pressures of the lubricating fluids by means of the pressure valves 252 and 256 in conjunction with the differential transformer 232 and the programmable controller 236.

Figure 5:
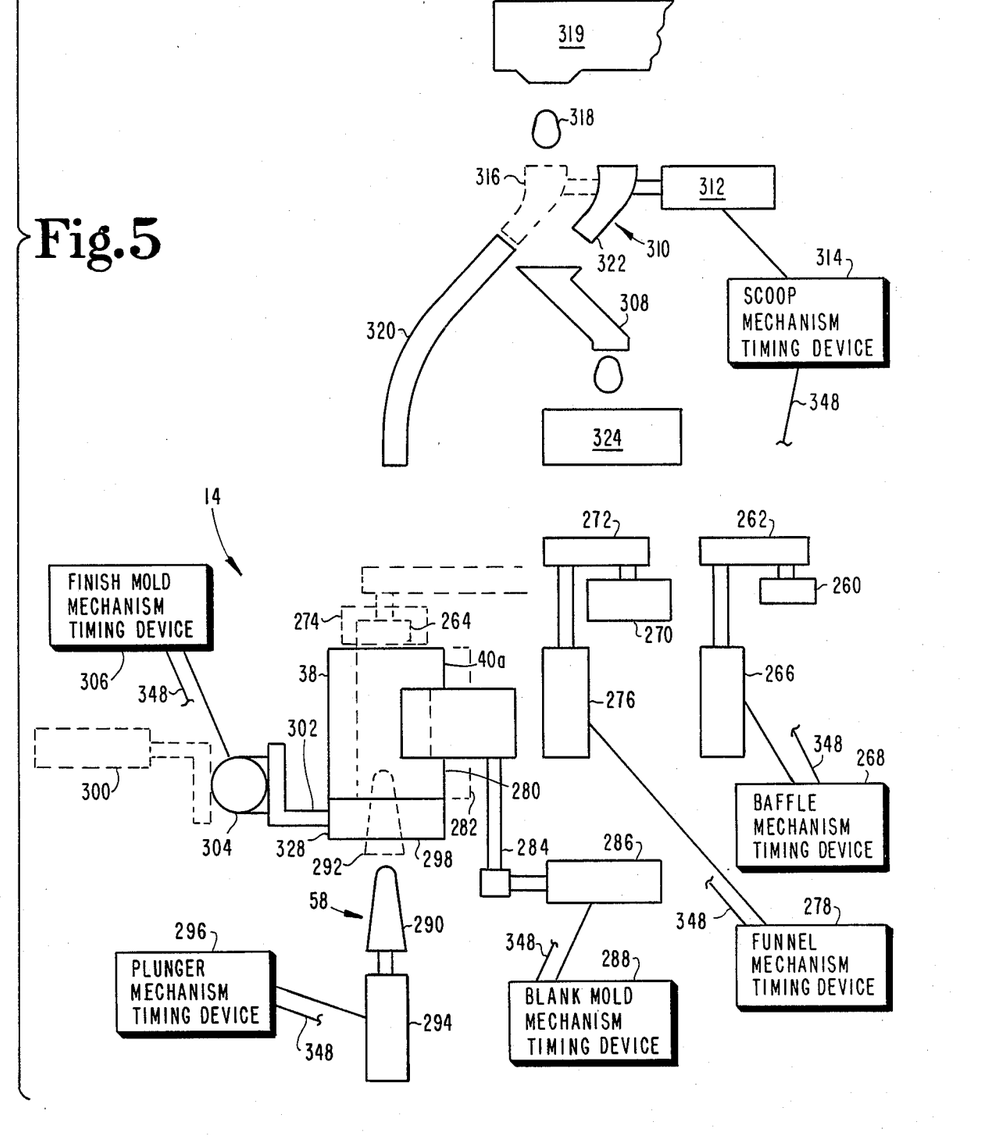
FIG. 5 is a schematic elevation of selected portions of the glassware molding machine and of selected portions of the present invention, showing the mechanism for interrupting the machine operation during the lubricating process.

Referring now to FIG. 5, selected portions of the glassware molding machine 14 are shown to pictorially illustrate mechanisms and timing devices that are a part of the glassware molding machine 14.

As is typical in the prior art, the glassware molding machine 14 includes an automatic cycle. The operated components and the timing devices thereof are as follows: a gob scoop 310 which is moved to a phantom position 316 by a scoop actuator 312 and a scoop timing device 314; a parison baffle mold 260 which is mounted to a baffle arm 262 and which is moved into a phantom position 264 by a baffle actuator 266 and a baffle timing device 268; a gob loading funnel 270 which is mounted to a funnel arm 272 and which is moved into a phantom position 274 by a funnel actuator 276 and a funnel timing device 278; the parison blank mold 38 with a mold half 40*a* which is moved to a closed position 280, and to an open phantom position 282, by a mold closing mechanism 284, a mold closing actuator 286, and a mold timing device 288; the parison plunger 58 which is actuated to a retracted position 290, as shown, and to a raised position 292, as shown by phantom lines, by a plunger actuator 294 and a plunger timing device 296; and the parison finish mold 328 which is actuated to a parison molding position 298, and to a body molding position 300, as shown by phantom lines, by a finish mold arm 302, a finish mold actuator 304, and a finish mold timing device 306.

In operation, the aforesaid timing devices of the glassware molding machine 14 are interrupted at a time when the mold halves 40a and 40b are closed, and the neck ring halves 52a and 52b are closed, and with parison plunger 58, the parison baffle mold 260, and the gob loading funnel 270 are all in the positions thereof as shown by solid lines. At this time, the scoop timing device 314 cooperates with the gob rejecting actuator .312 to move the scoop 310 away from a glassware producing position 316 wherein gobs 318 of molten glass are delivered from a molten glass reservoir 319 to the blank molding cavity 44 by a gob duct 320 and the gob loading funnel 270, to a gob diverting position 322 wherein gobs 318 of molten glass are diverted to the gob diverting duct 308 and a gob receiving container 324.

Referring again to FIG. 1, the glassware molding machine 14 includes a parison mold 326. The parison mold 326 includes the parison blank mold 38 and a parison finish mold 328. The parison finish mold 328 includes the neck ring 50 and the finish guide plate 54.

The parison mold 326 includes a parison molding cavity 330. The parison molding cavity 330 includes the blank molding cavity 44 of the parison blank mold 38, and a finish molding cavity 332 of the finish mold 328.

The parison molding cavity 330 includes a parison molding surface 334. The parison molding surface 334 includes the blank molding surface 46 of the parison blank mold 38 and a finish molding surface 336. The finish molding surface includes a sidewall molding surface 338 of the neck ring 50 and a horizontal molding surface 340 of the finish guide plate 54.

The blank molding cavity 44 includes the a waist, or first portion, 250 that is reduced in diameter from a shoulder or second portion 342 that is larger. In addition, the finish molding cavity 332 includes a cylindrical portion 344 and a grooved portion, or increased diameter portion, 346.

The present invention includes: means, including the linear differential transformer 232 and the shuttle 224 of FIG. 4A, for selectively distributing different lubricants to different portions, 44 or 332, of the parison molding cavity 330; means, including the rotary actuator 28 and the gears 32 and 34, for rotating the spray head, or directing head, 96; means, including the linear differential transformer 232 and the programmable controller 236, for applying selectively determined quantities of lubricant to predetermined portions, 250, 342 or 332, of the parison molding cavity 330.

The aforesaid applying of selectively determined quantities of lubricant to predetermined portions, 250, 342, or 332, is achieved by controlling the vertical velocity of the spray head 96 or by controlling the rate of flow of the vaporized lubricant. The velocity of the spray head 96 is selectively controlled by the programmable controller 236 and the flow control valve 246; and the rate of flow of the lubricant is selectively controlled by the programmable controller and one of the pressure valves, 252 or 256.

Referring to FIGS. 5 and 6, the present invention includes: means, including an interrupting signal conduit 348 which connects the programmable controller 236 to the scoop timing device 314, to the baffle timing device 268, to the funnel timing device 278, to the blank mold timing device 288, to the plunger timing device 296, and to the finish mold timing device 306.

The interrupting signal conduit 348 cooperates with the programmable controller 236 to provide an interrupting means for maintaining the gob rejecting scoop 310 in the reject position, for maintaining the mold halves 40a and 40b in a closed position, for maintaining the parison blank mold 38 and the parison finish mold 328 in a combined position, for maintaining the parison plunger 58 in a fixed position remote from the parison blank mold 38, for maintaining the parison baffle mold 260 in a fixed position remote from the parison blank mold 38, and for maintaining the gob loading funnel in a fixed position remote from the parison blank mold 38, during the time that the parison molding cavity 330 is being lubricated.

Further, the present invention includes means, including the chamber 160 and the orifices 162 of the orifice plate 164, for providing a barrier of air between the lubricant directing head 96 and the parison plunger 58; an exhaust means, including the flanged exhaust tube 86 and the telescoping sleeve 94, for collecting excess vaporized lubricant from the blank molding cavity 44, for turning the jets of barrier air, as indicated by lines 166 and arrows 170, upward, and for drawing barrier air, together with excess vaporized lubricant, upward between the spray spindle 26 and the blank molding cavity 44.

The method of the present invention includes: providing a lubricant directing or projecting means 10, which includes the directing spindle 26 and the directing head 96; positioning the directing head 96 into general alignment with the mold axis 48 and the parison molding cavity 330; moving the directing head 96 downwardly into the parison molding cavity 330; moving the directing head 96 upwardly with the directing head 96 spaced from the parison molding surface 334; and directing a vaporized lubricant onto the parison molding surface 334.

The preceding description has been directed to the embodiment of FIGS. 1–6 wherein the present invention is applied to the parison molding portion 12 of the glassware molding machine 14.

Figure 7:
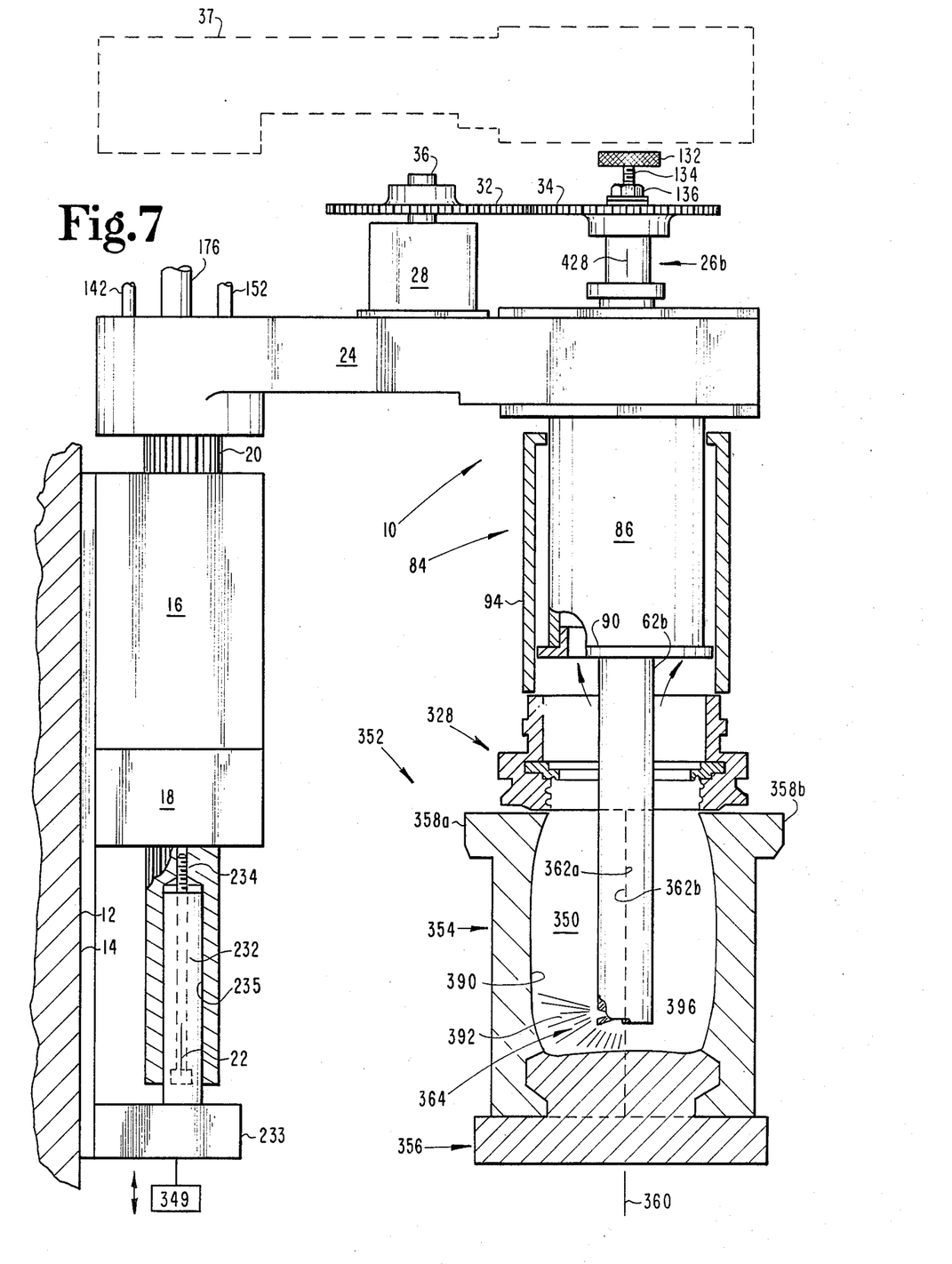
FIG. 7 is an elevation view similar to FIG. 1, of an embodiment as applied to the body molding portion of the glassware molding machine.
Figure 8:
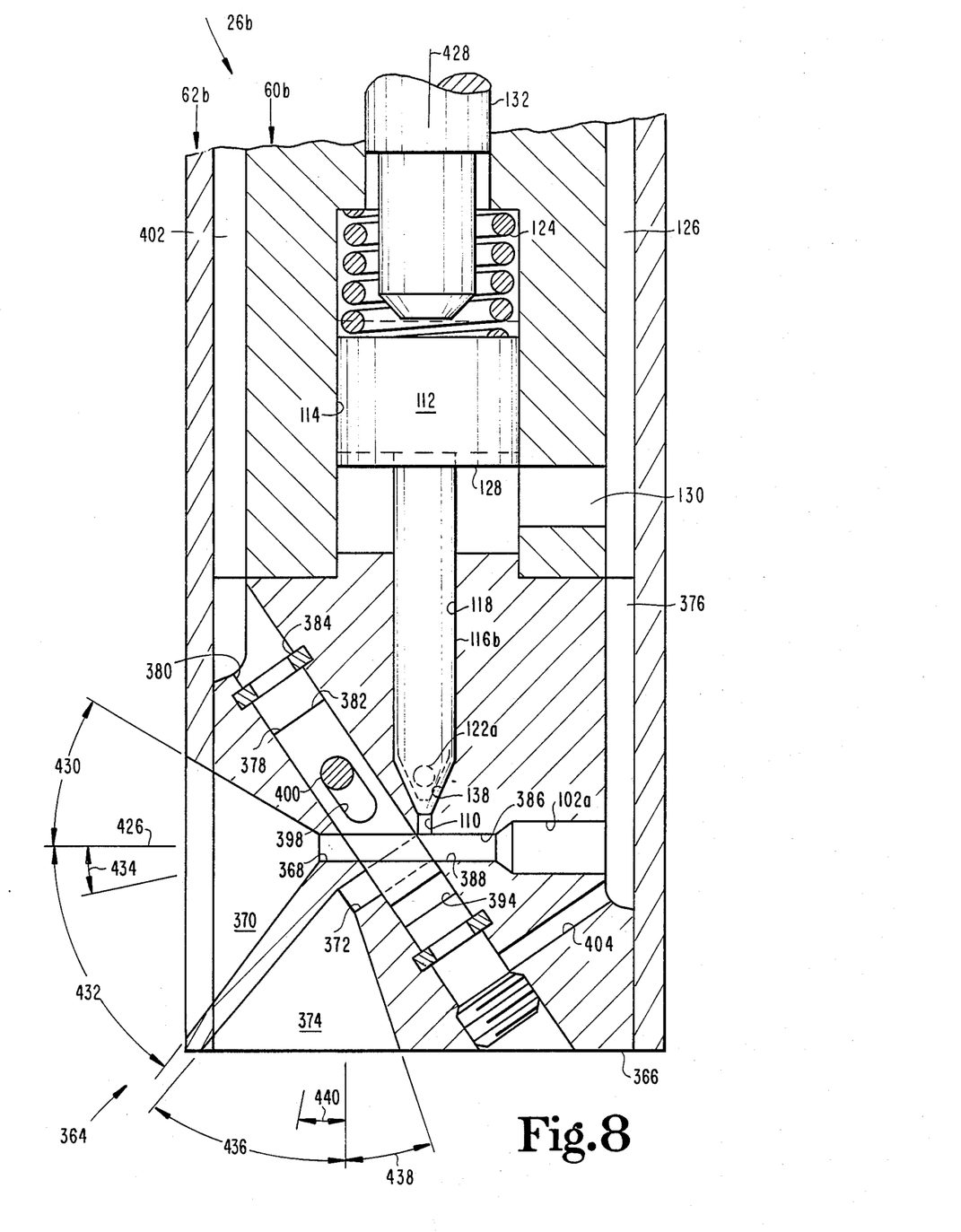
FIG. 8 is a cross sectional view, taken substantially the same as FIG. 7, showing internal details of the spray head for the embodiment of FIG. 7.
Figure 9:
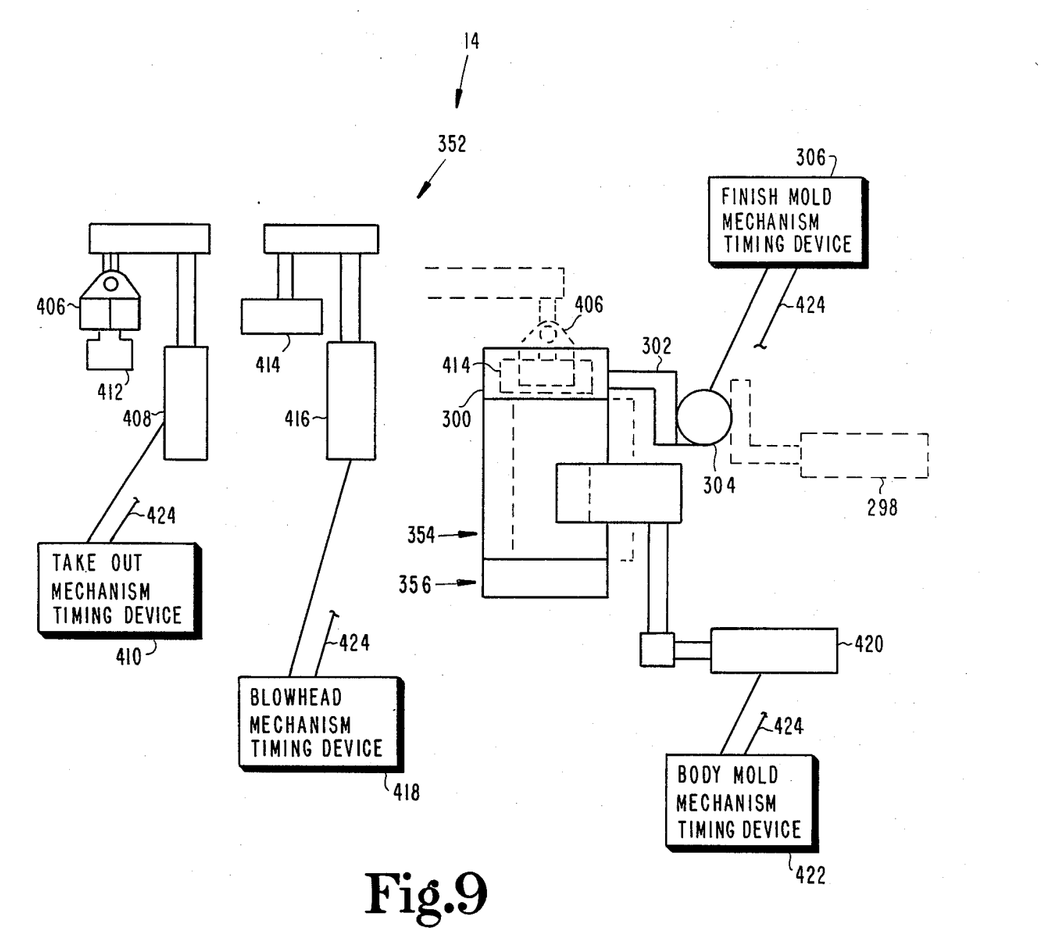
FIG. 9 is a schematic elevation of selected portions of the glassware molding machine and of selected portions of the embodiment FIG. 7, showing the mechanism for interrupting molding operations during the lubricating process.

Referring now to FIGS. 7–9, and more particularly to FIG. 7, the present invention is also applicable to lubricating a body molding cavity 350 of a body molding portion 352 of the glassware molding machine 14.

The body molding portion 352 includes as body side mold 354 and a body bottom mold 356 which cooperate to form the body molding cavity 350. The body side mold 354 includes side mold halves 358a and 358b that are openable by movement away from a body molding axis 360, and that are closable to the position shown by movement toward the body molding axis 360.

The embodiment of FIG. 7 also includes the spray apparatus, or directing apparatus, 10a with like-numbered and like-named parts that function as described previously with the embodiment of FIG. 1; so that very little description of the FIG. 7 embodiment will be required.

In operation, with mating surfaces 362a and 362b of the side mold halves 358a and 358b juxtaposed tightly together, a spray spindle, or directing spindle, 26b moves upwardly along the body molding axis 360, rotates, and lubricant is sprayed on the body molding cavity 350 by a spray head 364, as described for spraying the blank molding cavity 44 of FIG. 1.

Referring now to FIG. 8, the spray spindle 26b, and the spray head 364 thereof, includes like-numbered and like-named parts that function as described for the embodiments of FIGS. 3 and 3A; so it will not be necessary to describe the operation of the like-numbered and like-named parts in detail.

Briefly, the spray spindle 26b includes a spindle shaft 60b and a spindle sleeve 62b; and the spray head 364 includes a spray body, or directing body, 366.

The spray head 364 includes a side mold nozzle 368 that discharges into a side mold nozzle outlet 370 and a bottom mold nozzle 372 that discharges into a bottom mold nozzle outlet 374.

Lubricant is supplied to flow path 138 from feed passage 122a. Passage 122a is supplied with lubricant by means not shown, but similar to the means by which passage 122 is supplied in FIG. 3 and FIG. 3A. Also, as in FIG. 3 and FIG. 3A embodiments, the flow of lubricant is controlled by movement of piston 112 in response to air pressure from passage 130, and the rate of lubricant metered flow is controlled by adjusting screw 132.

A metering piston 112 and a metering poppet 116b, together with a spring 124 and an adjusting screw 132, control a metered flow path 138 that delivers lubricant from the passage 126 to a feed orifice 110.

Lubricant, mixed with air in nozzle portion 386, is delivered to either the side mold nozzle portion 368 or the bottom mold nozzle portion 372, depending upon the position of a shuttle 378.

The shuttle 378 in installed in a shuttle bore 380 and is actuated from the position shown to a position, not shown, wherein an end 382 of the shuttle 378 engages a stop ring 384.

Referring now to FIGS. 7 and 8, and more particularly to FIG. 8, when the shuttle 378 is in the position shown, lubricant, mixed with air, is delivered from the nozzle portion 386 to the side mold nozzle portion 368 via nozzle portion 388 in the shuttle 378; and lubricant is sprayed onto a side mold surface 390 of a body side cavity 392.

When the shuttle 378 is moved to the position, not shown, wherein the end 382 of the shuttle 378 abuts the stop ring 384, lubricant, mixed with air, is delivered from the nozzle portion 386 to the bottom mold nozzle portion 372 via nozzle portion 394 in the shuttle 378; and lubricant is sprayed onto a bottom mold surface 396 of the body bottom mold 356.

The shuttle 378 includes a slot 398; and the spray head 364 includes a pin 400 that is inserted through the slot 398 and is fixedly secured to the spray body 366. The pin 400 and the slot 398 cooperate to prevent rotation of the shuttle 378 and thereby assure that the nozzle portions 388 and 394 communicate the nozzle portion 386 with the side mold nozzle portion 368 and the bottom mold nozzle portion 372, respectively.

The shuttle 378 is actuated to the position shown when air pressure supplied to a passage 402 is greater than air pressure supplied to a transverse passage 404 from passages 126 and 376.

Air passage 402 is supplied by means not shown, but similar to the means by which air is supplied to passage 126, and is regulated by a pressure valve not shown but similar to the pressure valves 252 and 256 of FIG. 6, and is controlled by programmable controller 236 of FIG. 6 or by a separate controller if said separate controller is employed for the body mold lubrication.

Referring now to FIG. 9, the container body molding portion 352 of the glassware molding machine 14 includes a take out mechanism 406, a take out actuating mechanism 408, and a take out timing device 410 which cooperate to remove a finished container 412 from the body bottom mold 356 of FIG. 7.

The body molding portion 352 includes a container blowhead 414, a blowhead actuating mechanism 416, a blowhead timing device 418, the body bottom mold 356, the bottom side mold 354, a body mold actuating mechanism 420 which opens and closes the side mold halves 358a and 358b of FIG. 7, and a body mold timing device 422.

The body molding portion 352 and the parison molding portion 12 of the glassware molding machine 14 share the parison finish mold 328, the finish mold arm 302, the finish mold actuator 304, and the finish mold timing device 306.

An interrupting signal conduit 424 is connected to the take out timing device 410, is connected to the blowhead timing device 418, is connected to the body mold timing device 422, is connected to the finish mold timing device 306, and cooperates with the programmable controller 236 as shown in FIG. 6, or with a separate similar controller, to provide an interrupting means for interrupting the automatic cycling of the take out actuating mechanism 408, the blowhead actuating mechanism 416, the body mold actuating mechanism 420, and the finish mold actuating mechanism 304.

The interrupting means of the interrupting signal conduit 424 assures that the take out mechanism 406 is kept remote from the container body side mold 354 during the lubricating cycle, assures that the blowhead 414 is kept remote from the body side mold 354 during the lubricating cycle, assures that the finish mold 328 is kept in communication with body side mold 354, and assures that the side mold halves 358a and 358b are kept closed with the mating surfaces 362a and 362b thereof abutted tightly together during the lubricating cycle.

The interrupting means of the present invention includes both the interrupting signal conduit 348 of FIGS. 5 and 6 and the interrupting signal conduit 424 of FIG. 9; and the interrupting signal conduits, 348 and 424, may be used separately or together to stop part or all functions of the automatic cycle during lubrication of the blank molding cavity 44, the finish molding cavity 332 and/or the body molding cavity 350.

Preferably, the side mold nozzle portion 368 is disposed along a nozzle axis 426 that is ninety degrees to a spindle axis 428, the side mold nozzle outlet 370 is a flat slot that angles upwardly at an angle 430 from the nozzle axis 426 and downwardly at an angle 432; so that the side mold nozzle portion 368 and the side mold nozzle outlet 370 cooperate to direct vaporized lubricant generally at a directing angle 434 downwardly from the nozzle axis 426.

Preferably, the bottom mold nozzle outlet 374 is a flat slot that angles outwardly by an angle 436, and angles inwardly by an angle 438; so that the bottom mold nozzle portion 372 and the bottom mold nozzle outlet 374 cooperate to direct vaporized lubricant generally at a directing angle 440 inwardly with respect to the spindle axis 428.

Thus, the side mold nozzle 368 and the side mold nozzle outlet 370 cooperate to direct vaporized lubricant at a directing angle 434 for lubricating the container body side mold 354; and the bottom mold nozzle 372 and the bottom mold nozzle outlet 374 cooperate to direct vaporized lubricant at a directing angle 440 for lubricating the container body bottom mold 356.

In the embodiment described for lubrication of the container body molding cavity, lubrication of the finish mold may also be included, as an option to the means previously described for finish mold lubrication included in the embodiment described for lubrication of the parison molding cavity. Referring to FIG. 7, finish mold 328 may be maintained in position above container body molding portion 352 during the lubrication of the body molding cavity 350 and/or the finish molding cavity 332.

In summary, the present invention includes a spray apparatus, or a directing apparatus, 10, and a method for lubricating or applying a parting agent to the blank molding cavity 44 of the parison molding portion 12. Also, the present invention includes a spray apparatus, or a directing apparatus, 10a, and a method for lubricating the container body molding cavity 350 of the body molding portion 352 of the glassware molding machine 14. Additionally, the present invention includes optional apparatus and method for lubricating the finish molding cavity 332 of the parison molding portion 12 in conjunction with lubrication of either the blank molding cavity 44 or the body molding cavity 350.

The present invention provides apparatus and method for maintaining associated parts of the parison mold 326 together during the lubricating process. These associated parts may include the mold halves 40a and 40b being juxtaposed together, and may include the parison finish mold 328 being juxtaposed against the parison blank mold 38.

Finally, the present invention provides apparatus and method for maintaining associated parts of a container body molding portion 352 together during the lubricating process. These associated parts may include the body side mold halves 358a and 358b being juxtaposed together, may include the container body bottom mold 356 being juxtaposed against the container body side mold 354 and may include the finish mold 328 being juxtaposed against the body side mold 354.

While specific apparatus has been disclosed in the preceding description, it should be understood that these specifics have been given for the purpose of disclosing the principles of the present invention and that many variations thereof will become apparent to those who are versed in the art. For example, this invention has utility beyond single gob molding machines and would be useful in multiple gob molding machines as well. Therefore, the scope of the present invention is to be determined by the appended claims.

INDUSTRIAL APPLICABILITY

The present invention is applicable to glassware molding machines 14 of the type having a parison molding portion 12 in which a parison blank mold 38 and a parison finish mold 328 cooperate to form a parison from a gob 318 of molten glass, and in which the parison is subsequently transported to a container body molding portion 352 of the glassware molding machine.

What is claimed is:

1. In an apparatus for lubricating molding surfaces in a glassware molding machine that combine to form a molding cavity around a longitudinal axis, the improvement which comprises lubricant directing means comprising a directing head having an internal passage therein for a lubricant, said directing head is advanceable to a position in alignment with said axis of said molding cavity spaced from and independent of the molding surfaces of said molding cavity to direct said lubricant onto said molding surfaces to form a coating of lubricant thereon when said molding surfaces are combined to form said molding cavity, and having means for advancing and withdrawing said directing head into and out of said molding cavity, said directing head traveling in alignment with said longitudinal axis essentially along the full length of said axis.

2. An apparatus as claimed in claim 1 in which said improvement further comprises means associated with said directing means for selectively distributing different lubricants to different portions of said molding cavity.

3. An apparatus as claimed in claim 1 in which said apparatus further includes means for applying a predetermined quantity of said lubricant onto predetermined sections of said molding surfaces of said molding cavity.

4. An apparatus as claimed in claim 1 in which said directing means includes means for selectively directing said lubricant at a first angle to said mold axis, and for selectively directing said lubricant at a second angle to said mold axis.

5. An apparatus as claimed in claim 1 in which said directing means includes means, comprising first and second nozzles, for directing said lubricant at first and second angles to said mold axis and a shuttle, for selectively directing said lubricant through one or the other of said nozzles.

6. An apparatus as claimed in claim 1 in which said lubricant directing means includes means for rotating said directing head.

7. An apparatus as claimed in claim 1 in which said improvement comprises an exhaust means associated with said lubricant directing means for collecting excess lubricant from said molding cavity.

8. In an apparatus for lubricating molding surfaces in a glassware molding machine of the type having a mold with mold halves that are openable and that are closeable around a longitudinal axis to form a molding cavity, the improvement which comprises: projecting means, comprising a projection head having an internal passage therein for a lubricant, for movement of said projection head to said longitudinal axis and into said molding cavity, and for projecting lubricant onto said molding surfaces of said molding cavity while said mold halves are in a closed position, and having means for advancing and withdrawing said projection head into and out of said molding cavity, said projection head traveling in alignment with said longitudinal axis essentially along the full length of said axis.

9. An apparatus as claimed in claim 8 in which said machine includes an automatic cycle for producing said glassware; said improvement further comprises means for periodically interrupting said automatic cycle when said mold halves are closed, for projecting said lubricant when said automatic cycle is interrupted, and for moving said projection head away from said mold axis during said automatic cycle; whereby dripping of lubricant into said molding cavity from said projection head during said automatic cycle is precluded.

10. An apparatus as claimed in claim 8 in which said mold comprises a parison blank mold and a parison finish mold, and said machine includes a parison plunger that cooperates with said parison blank mold and said parison finish mold to form a parison, the improvement further comprising barrier means, being operatively connected to said projection head, for directing fluid between said lubricant and said parison plunger and thereby minimizing depositing of lubricant onto said parison plunger.

11. An apparatus as claimed in claim 8 in which said improvement comprises exhaust means for collecting excess lubricant.

* * * * *